2,727,693

PROCESS FOR CONVERTING FUSED POLY-ETHYLENE INTO A POWDER

Robert E. Cairns, Springfield, Mass., assignor to Monsanto Chemical Company, St. Louis, Mo., a corporation of Delaware No Drawing. Application January 22, 1954, Serial No. 405,652

2 Claims. (Cl. 241—23)

This invention relates to polyethylene molding powders and to methods for their preparation.

Polyethylene, for the purposes of this invention, is a homopolymer of ethylene which is normally solid and has a molecular weight of between 15,000 and 25,000. It is a tough solid at normal temperatures with a fusion point of from 200° F. to 250° F. The homopolymers are generally prepared by mass polymerization under elevated pressures and temperatures as described, for example, in Fawcett Patent 2,153,553. The polymers produced by this process are generally non-uniform in physical structure. To render them uniform it is necessary to fuse them under certain critical conditions. The fused polymers cannot be ground into a powder which is desirable for many fabricating processes such as flame-spraying, injection molding, etc.

One object of this invention is to provide a polyethylene molding powder.

A further object of this invention is to provide a process for converting polyethylene into a uniform pulverulent form.

These and other objects are attained by subjecting the polyethylene to intensive mechanical action in a closed chamber provided with a plurality of rotating members under critical conditions of temperature, pressure and peripheral speed of the rotating members.

The following examples are given in illustration and are not intended as limitations on the scope of this invention.

EXAMPLE I

Polyethylene pellets were loaded into a Banbury-type mixer. The temperature of the polyethylene on loading was about 55° F. Cold water at about 50° F. was circulated through the rotor and wall jackets. The mixer was then started at a peripheral speed of the fast rotor of from 220 to 230 feet per minute and at the same time a pressure of about 25 p. s. i. was exerted on the polyethylene. After one minute the temperature of the polyethylene rose to about 210° F. At this point the pressure was reduced to from 1 to 2 p. s. i. and the rotor speed was reduced to 110 to 120 feet per minute. Mixing at the reduced speed and pressure was continued for two minutes. The pressure was then increased to 25 p. s. i. for one minute without changing the rotor speed. Finally the rotor speed was increased to 220 to 230 feet per minute and the pressure reduced to about 1 to 2 p. s. i. Mixing was continued under these conditions for about two minutes. During the mixing cycle 50° F. water was circulated through rotor and wall jackets of the mixer. Shortly after the mixing started the polyethylene fused and it stayed in the fused condition until the second minute of operation at 220 to 230 feet per minute and 1 to 2 p. s. i., when it suddenly distintegrated into a fine powder. The disintegration took place quickly and was complete within about one or two minutes after the first appearance of powder. The mixer was then stopped and the powder examined for homogeneity. It was found that there were substantially no fused particles or lumps in the entire mixer load and that the particle size of the powder was remarkably uniform.

The powder thus prepared was easily injection molded or extruded alone or in combination with lubricants, colors, dyes, pigments, fillers, etc. It was also of proper dimensions for efficient use in flame-spraying apparatus where non-uniform particle size causes much difficulty.

EXAMPLE II

Polyethylene having a molecular weight of about 22,000 was charged to a Banbury-type mixer of a much larger size than the mixer of Example I. The rotor and wall jackets were cooled by circulation of 60° F. water therethrough and kept cool throughout the following cycle. The mixer was started at a peripheral speed of the fast rotor of about 280 feet per minute and a pressure of about 30 p. s. i. was exerted on the polyethylene simultaneously with the start of the mixer. Mixing under these conditions was continued for two minutes at which time the polyethylene was partially fused. The pressure was then dropped to about 5 p. s. i. and the rotor speed was decreased to about 140 feet per minute. The mixing was continued for two minutes under these conditions during which time the polyethylene became further fused and homogenized. Pressure was then increased to 30 p. s. i. for one minute. Finally the rotor speed was increased to 280 feet per minute and the pressure was reduced to 5 p. s. i. After three minutes the mass in the mixer began to disintegrate and within five minutes total disintegration had occurred. The powder recovered contained substantially no fused lumps and could be used directly in injection molding operations, extrusion and flame-spraying processes.

The process of this invention is restricted to intensive mixing of the polyethylene in an enclosed chamber under positive pressure, the mixing action being applied by a plurality of rotating members which turn at different peripheral speeds. The mixing action occurs in the area between the rotating members and also in the area between the wall surfaces of the chamber and the surfaces of the rotating members. This type of mixing results in the transformation of the energy of rotation of the rotating members into heat in the polyethylene through the agency of friction both internal and external with respect to the polyethylene.

One type of apparatus suitable for providing the intensive mechanical action of this invention is the mixer known as a Banbury mixer. Banbury mixers consist essentially of a completely enclosed mixing chamber in which two spirally shaped rotors revolve in opposite directions at slightly different speeds. The two rotors are geared together in such a way that the speed of the slower rotor is governed by the speed of the faster one. The mixers have a hopper in which a pressure head may be inserted to exert pressure on the material being mixed. The rotor and walls of the mixer are cored for the circulation of temperature regulating media therethrough.

In the process of this invention, the peripheral speed of the faster rotor must be accurately controlled in a specific cycle. In the first step of the cycle, the peripheral speed of the faster rotor must be controlled within the limits of 200 to 285 feet per minute. In the next two steps of the cycle the peripheral speed must be reduced to 100 to 150 feet per minute and in the final step the speed must be brought back to the 200 to 285 feet per minute range.

The pressure exerted on the stock of polyethylene must also be carefully controlled along with the time in each step of the mixing cycle. In the first step at the high speed, the pressure may vary from 20 to 30 p. s. i. In the second step, the pressure must be reduced to from 1 to 5 p. s. i. In the third step the pressure is increased to the 20 to 30 p. s. i. range and in the final step it is again reduced to the 1 to 5 p. s. i. range.

The duration of each step in the cycle also must be controlled to obtain the beneficial results of this invention. The first step may cover a period of from 1 to 3 minutes, the second step from 2 to 4 minutes, the third step from 1 to 2 minutes and the final step at least 2 minutes or until the powder is formed.

In tabular form the cycles are as follows:

*Table I*

| Step | Rotor Speed, ft./min. | Pressure, p. s. i. | Time, min. |
|---|---|---|---|
| 1 | 200-285 | 20-30 | 1-2 |
| 2 | 100-150 | 1-5 | 2-4 |
| 3 | 100-150 | 20-30 | 1-2 |
| 4 | 200-285 | 1-5 | 2+ |

Throughout the mixing cycle the rotor and mixer walls must be cooled by the circulation of cooling fluids through the rotor cores and the wall jackets. The temperature of the cooling fluid should be within the range of 35° F. and 80° F.

The process of this invention is applicable to solid tough homopolymers of ethylene having a molecular weight of between 15,000 and 25,000. This material as made by conventional processes is non-homogeneous and must be fused under carefully controlled conditions to obtain a homogeneous product. After fusion the material is difficult to pulverize because of its extreme toughness. By the process of this invention the fused material is easily and quickly converted into a uniform finely divided powder.

What is claimed is:

1. A process for converting fused polyethylene into a powder which comprises subjecting the polyethylene to intensive mixing in a closed chamber under positive pressure, the mixing action being applied by a plurality of rotating members turning at different peripheral speeds, said intensive mixing being controlled by the following cycle during which the rotating members and the walls of the chamber are kept cool by circulating water at temperatures of from 35 to 80° F. within said rotating members and walls;

| Step | Rotor Speed ft./min. | Pressure, p. s. i. | Time, min. |
|---|---|---|---|
| 1 | 200-285 | 20-30 | 1-2 |
| 2 | 100-150 | 1-5 | 2-4 |
| 3 | 100-150 | 20-30 | 1-2 |
| 4 | 200-285 | 1-5 | 2+ |

2. A process as in claim 1 wherein the mixing cycle is

| Step | Rotor Speed, ft./min. | Pressure, p. s. i. | Time, min. |
|---|---|---|---|
| 1 | 220-230 | 25 | 1 |
| 2 | 110-120 | 1-2 | 2 |
| 3 | 110-120 | 25 | 1 |
| 4 | 220-230 | 1-2 | 2 |

References Cited in the file of this patent

UNITED STATES PATENTS

| | | |
|---|---|---|
| 2,059,394 | Randolph | Nov. 3, 1936 |
| 2,451,743 | Jarvett | Oct. 19, 1948 |
| 2,582,327 | Haine | Jan. 15, 1952 |
| 2,677,504 | Klingel | May 4, 1954 |